(12) United States Patent
Ishizeki et al.

(10) Patent No.: US 10,814,698 B2
(45) Date of Patent: Oct. 27, 2020

(54) VEHICLE AIR CONDITIONING DEVICE

(71) Applicant: SANDEN AUTOMOTIVE CLIMATE SYSTEMS CORPORATION, Isesaki-shi (JP)

(72) Inventors: Tetsuya Ishizeki, Isesaki (JP); Kazuki Sekiguchi, Isesaki (JP); Kohei Yamashita, Isesak (JP); Ryo Miyakoshi, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 252 days.

(21) Appl. No.: 16/084,887

(22) PCT Filed: Apr. 5, 2017

(86) PCT No.: PCT/JP2017/014889
§ 371 (c)(1),
(2) Date: Sep. 13, 2018

(87) PCT Pub. No.: WO2017/179596
PCT Pub. Date: Oct. 19, 2017

(65) Prior Publication Data
US 2019/0077223 A1 Mar. 14, 2019

(30) Foreign Application Priority Data

Apr. 14, 2016 (JP) .................................. 2016-081223

(51) Int. Cl.
| | | |
|---|---|---|
| *B60H 1/22* | (2006.01) | |
| *F25B 1/00* | (2006.01) | |
| *B60H 1/32* | (2006.01) | |

(52) U.S. Cl.
CPC ............. *B60H 1/2218* (2013.01); *B60H 1/22* (2013.01); *B60H 1/32* (2013.01); *B60H 1/3202* (2013.01);
(Continued)

(58) Field of Classification Search
CPC ...... B60H 2001/00142; B60H 1/00885; B60H 1/00914; F25B 41/046
See application file for complete search history.

(56) References Cited

U.S. PATENT DOCUMENTS

| | | | | |
|---|---|---|---|---|
| 5,598,887 A | * | 2/1997 | Ikeda ................. | B60H 1/00392 165/202 |
| 2019/0077222 A1 | * | 3/2019 | Ishizeki ............... | B60H 1/3216 |

FOREIGN PATENT DOCUMENTS

| | | |
|---|---|---|
| JP | 4-28955 | 1/1992 |
| JP | 2000-18739 | 1/2000 |

(Continued)

*Primary Examiner* — Cassey D Bauer
(74) *Attorney, Agent, or Firm* — Cozen O'Connor (57) ABSTRACT

A vehicle air conditioning device which is capable of inhibiting liquid return to a compressor and generation of noise due to bumping in an accumulator. There are executed a heating mode to close a solenoid valve 17, open a solenoid valve 21, let a refrigerant from a compressor 2 radiate heat in a radiator 4, decompress the refrigerant through an outdoor expansion valve 6, let the refrigerant absorb heat in an outdoor heat exchanger 7, and send the refrigerant to an accumulator 12, and a dehumidifying and cooling mode to open the solenoid valve 17, close the solenoid valve 21, decompress the refrigerant through an indoor expansion valve 8, let the refrigerant absorb heat in a heat absorber, and send the refrigerant to the accumulator. When shifting from the heating mode to the dehumidifying and cooling mode, the solenoid valve 21 is opened for a predetermined period of time.

5 Claims, 5 Drawing Sheets

(52) U.S. Cl.
CPC ........ *F25B 1/00* (2013.01); *B60H 2001/2228* (2013.01); *B60H 2001/2268* (2013.01)

(56) References Cited

FOREIGN PATENT DOCUMENTS

| | | |
|---|---|---|
| JP | 2005-514253 | 5/2005 |
| JP | 2013-139245 | 7/2013 |
| JP | 2014-94671 | 5/2014 |
| JP | 2016-223705 | 12/2016 |

\* cited by examiner

VEHICLE AIR CONDITIONING DEVICE

RELATED APPLICATIONS

This is a U.S. National Phase Application under 35 USC 371 of International Application PCT/JP2017/014889 filed on Apr. 5, 2017.

This application claims the priority of Japanese application no. 2016-081223 filed Apr. 14, 2016, the entire content of which is hereby incorporated by reference.

TECHNICAL FIELD

The present invention relates to an air conditioning device of a heat pump system which conditions air of a vehicle interior, and more particularly, it relates to an air conditioning device which is applicable to a hybrid car and an electric vehicle.

BACKGROUND ART

To cope with enhancement of environmental problems in recent years, hybrid cars and electric vehicles have spread. Furthermore, as an air conditioning device which is applicable to such a vehicle, there has been developed a device including a compressor to compress and discharge a refrigerant, a radiator disposed on the side of a vehicle interior to let the refrigerant radiate heat, a heat absorber disposed on the side of the vehicle interior to let the refrigerant absorb heat, and an outdoor heat exchanger disposed outside the vehicle interior to let the refrigerant radiate heat or absorb heat, and there are changed and executed a heating mode to let the refrigerant discharged from the compressor radiate heat in the radiator and decompress the refrigerant from which the heat has been radiated in this radiator through an outdoor expansion valve and then let the refrigerant absorb heat in the outdoor heat exchanger, a dehumidifying and heating mode or a dehumidifying and cooling mode to let the refrigerant discharged from the compressor radiate heat in the radiator and the outdoor heat exchanger and decompress the refrigerant from which the heat has been radiated through an indoor expansion valve and then let the refrigerant absorb heat in the heat absorber, and a cooling mode to let the refrigerant discharged from the compressor radiate heat in the outdoor heat exchanger and decompress the refrigerant from which the heat has been radiated through the indoor expansion valve and then let the refrigerant absorb heat in the heat absorber.

In this case, an accumulator is disposed on a refrigerant suction side of the compressor. In the heating mode, a solenoid valve for cooling is closed, and a solenoid valve for heating is opened to send, to the accumulator, the refrigerant flowing out from the outdoor heat exchanger. For example, in the cooling mode, the solenoid valve for the heating is closed, and the solenoid valve for the cooling is opened to send, to the indoor expansion valve, the refrigerant flowing out from the outdoor heat exchanger and to send, to the accumulator, the refrigerant which has flowed through the heat absorber. In this constitution, the refrigerant is once stored in this accumulator, thereby performing gas-liquid separation therein, and this gas refrigerant is sucked into the compressor, so that liquid return to the compressor is prevented or inhibited (e.g., see Patent Document 1).

CITATION LIST

Patent Documents

Patent Document 1: Japanese Patent Application Publication No. 2014-94671

SUMMARY OF THE INVENTION

Problems to be Solved by the Invention

Here, a refrigerant and oil flowing out from a compressor through a refrigerant circuit flow into an accumulator when a compressor is stopped, their liquid part is accumulated in the accumulator, and the oil having a smaller specific weight forms a layer on the liquid refrigerant, thereby bringing about a stable state like a state of being closed with a lid. Particularly, in a heating mode to be executed in an environment where an outdoor air temperature is low, there increase amounts of the liquid refrigerant and oil which flow out from an outdoor heat exchanger through a solenoid valve for heating into the accumulator and are accumulated therein. Therefore, an oil surface (a liquid surface in the accumulator) rises up to the vicinity of an outlet of the accumulator.

In such a state, when a heating mode to decompress the refrigerant through an outdoor expansion valve changes to another operation mode to decompress the refrigerant through an indoor expansion valve (the above dehumidifying and heating mode or dehumidifying and cooling mode, or a cooling mode), the refrigerant flowing out from the outdoor heat exchanger flows on the side of the indoor expansion valve. On the other hand, the compressor sucks the refrigerant in the accumulator, and hence a pressure in the accumulator rapidly drops. When the pressure in the accumulator rapidly drops in this manner, a phenomenon referred to as so-called bumping occurs where the refrigerant below the oil boils and vaporizes without stopping, and intensely breaks through the upper oil layer.

Then, when this bumping intensifies, a lot of liquid refrigerant in the accumulator is pushed out from the outlet, excessive liquid return to the compressor accordingly occurs, and liquid compression impairs reliability of the compressor. Additionally, the bumping phenomenon in the accumulator generates a comparatively large noise, and hence there has also been the problem that comfort of passengers is impaired by the generation of the noise.

The present invention has been developed to solve such conventional technical problems, and an object thereof is to provide a vehicle air conditioning device which is capable of preventing or inhibiting liquid return to a compressor and generation of noise in an accumulator, which occur, for example, when an operation mode to decompress a refrigerant through an outdoor expansion valve is changed to another operation mode to decompress the refrigerant through an indoor expansion valve.

Means for Solving the Problems

A vehicle air conditioning device of the invention of claim 1 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, an indoor expansion valve to decompress the refrigerant flowing into the heat absorber, an accumulator connected to a refrigerant suction side of the compressor, a first opening/closing valve to send the refrigerant flowing out from the outdoor heat exchanger, through the indoor expansion valve to the heat absorber, a second opening/closing valve to send the refrigerant flowing out from the outdoor heat exchanger to the accumulator without passing the heat absorber, and a control device, so that this control device switches between and executes a first operation mode to close the first opening/closing valve, open the second opening/closing valve, thereby let the refrigerant discharged from the compressor radiate heat in the radiator, decompress the refrigerant from which the heat has been radiated, through the outdoor expansion valve, let the refrigerant absorb heat in the outdoor heat exchanger, send, to the accumulator, the refrigerant flowing out from this outdoor heat exchanger, and suck the refrigerant from this accumulator into the compressor, and a second operation mode to open the first opening/closing valve, close the second opening/closing valve, thereby decompress the refrigerant flowing out from the outdoor heat exchanger through the indoor expansion valve, let the refrigerant absorb heat in the heat absorber, send, to the accumulator, the refrigerant flowing out from this heat absorber, and suck the refrigerant from this accumulator into the compressor, and the vehicle air conditioning device is characterized in that when the control device shifts from the first operation mode to the second operation mode, the second opening/closing valve is opened for a predetermined period of time after the shift.

A vehicle air conditioning device of the invention of claim 2 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, an indoor expansion valve to decompress the refrigerant flowing into the heat absorber, an accumulator connected to a refrigerant suction side of the compressor, a first opening/closing valve to send the refrigerant flowing out from the outdoor heat exchanger, through the indoor expansion valve to the heat absorber, a second opening/closing valve to send the refrigerant flowing out from the outdoor heat exchanger to the accumulator without passing the heat absorber, and a control device, so that this control device switches between and executes a first operation mode to close the first opening/closing valve, open the second opening/closing valve, thereby let the refrigerant discharged from the compressor radiate heat in the radiator, decompress the refrigerant from which the heat has been radiated, through the outdoor expansion valve, let the refrigerant absorb heat in the outdoor heat exchanger, send, to the accumulator, the refrigerant flowing out from this outdoor heat exchanger, and suck the refrigerant from this accumulator into the compressor, and a second operation mode to open the first opening/closing valve, close the second opening/closing valve, thereby decompress the refrigerant flowing out from the outdoor heat exchanger through the indoor expansion valve, let the refrigerant absorb heat in the heat absorber, send, to the accumulator, the refrigerant flowing out from this heat absorber, and suck the refrigerant from this accumulator into the compressor, and the vehicle air conditioning device is characterized in that when the control device starts the compressor in the second operation mode, the second opening/closing valve is opened for a predetermined period of time after the start.

The vehicle air conditioning device of the invention of claim 3 is characterized in that in the above respective inventions, when shifting from the first operation mode to the second operation mode or when starting the compressor in the second operation mode, the control device opens the outdoor expansion valve in a state where the second opening/closing valve is opened, and operate the compressor.

The vehicle air conditioning device of the invention of claim 4 is characterized in that the above respective inventions include a bypass pipe bypassing the radiator and the outdoor expansion valve, to send, directly into the outdoor heat exchanger, the refrigerant discharged from the compressor, a third opening/closing valve to send the refrigerant discharged from the compressor to the radiator, a fourth opening/closing valve to send the refrigerant discharged from the compressor to the bypass pipe, and an auxiliary heating device to heat the air to be supplied from the air flow passage to the vehicle interior, the first operation mode is a heating mode, and in this heating mode, the control device opens the third opening/closing valve and closes the fourth opening/closing valve, and the second operation mode includes any one, any combination or all of a dehumidifying and heating mode to close the third opening/closing valve and the outdoor expansion valve, open the fourth opening/closing valve, thereby send the refrigerant discharged from the compressor from the bypass pipe to the outdoor heat exchanger, let the refrigerant radiate heat, decompress the refrigerant from which the heat has been radiated, through the indoor expansion valve, let the refrigerant absorb heat in the heat absorber, and generate heat in the auxiliary heating device, a dehumidifying and cooling mode to open the third opening/closing valve, close the fourth opening/closing valve, thereby send the refrigerant discharged from the compressor from the radiator to the outdoor heat exchanger, let the refrigerant radiate heat in the radiator and the outdoor heat exchanger, decompress the refrigerant from which the heat has been radiated, through the indoor expansion valve, and then let the refrigerant absorb heat in the heat absorber, a cooling mode to open the third opening/closing valve, close the fourth opening/closing valve, thereby send the refrigerant discharged from the compressor from the radiator to the outdoor heat exchanger, let the refrigerant radiate heat in the outdoor heat exchanger, decompress the refrigerant from which the heat has been radiated, through the indoor expansion valve, and then let the refrigerant absorb heat in the heat absorber, and a maximum cooling mode to close the third opening/closing valve and the outdoor expansion valve, open the fourth opening/closing valve, thereby send the refrigerant discharged from the compressor from the bypass pipe to the outdoor heat exchanger, let the refrigerant radiate heat, decompress the refrigerant from which the heat has been radiated, through the indoor expansion valve, and then let the refrigerant absorb heat in the heat absorber.

The vehicle air conditioning device of the invention of claim 5 is characterized in that in the above invention, the second operation mode includes the dehumidifying and cooling mode and/or the cooling mode.

Advantageous Effect of the Invention

According to the invention of claim 1, a vehicle air conditioning device includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, an indoor expansion valve to decompress the refrigerant flowing into the heat absorber, an accumulator connected to a refrigerant suction side of the compressor, a first opening/closing valve to send the refrigerant flowing out from the outdoor heat exchanger, through the indoor expansion valve to the heat absorber, a second opening/closing valve to send the refrigerant flowing out from the outdoor heat exchanger to the accumulator without passing the heat absorber, and a control device, and this control device switches between and executes a first operation mode to close the first opening/closing valve, open the second opening/closing valve, thereby let the refrigerant discharged from the compressor radiate heat in the radiator, decompress the refrigerant from which the heat has been radiated, through the outdoor expansion valve, let the refrigerant absorb heat in the outdoor heat exchanger, send, to the accumulator, the refrigerant flowing out from this outdoor heat exchanger, and suck the refrigerant from this accumulator into the compressor, and a second operation mode to open the first opening/closing valve, close the second opening/closing valve, thereby decompress the refrigerant flowing out from the outdoor heat exchanger through the indoor expansion valve, let the refrigerant absorb heat in the heat absorber, send, to the accumulator, the refrigerant flowing out from this heat absorber, and suck the refrigerant from this accumulator into the compressor. In the vehicle air conditioning device, when the control device shifts from the first operation mode to the second operation mode, the second opening/closing valve is opened for a predetermined period of time after the shift. Consequently, when changing from the first operation mode to the second operation mode, a large amount of refrigerant can be returned to the accumulator through the second opening/closing valve, and the inside of the accumulator can be stirred.

In consequence, a stable state in the accumulator can be broken, and hence it is possible to prevent or inhibit occurrence of bumping which occurs when a pressure in the accumulator drops in a stable state like a state of closing the upside of a liquid refrigerant with a lid of oil. Furthermore, it is possible to effectively eliminate or inhibit liquid compression in the compressor and generation of noise in the accumulator, it is possible to enhance reliability of the vehicle air conditioning device, and it is possible to effectively improve comfort of passengers.

According to the invention of claim 2, a vehicle air conditioning device includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, an indoor expansion valve to decompress the refrigerant flowing into the heat absorber, an accumulator connected to a refrigerant suction side of the compressor, a first opening/closing valve to send the refrigerant flowing out from the outdoor heat exchanger, through the indoor expansion valve to the heat absorber, a second opening/closing valve to send the refrigerant flowing out from the outdoor heat exchanger to the accumulator without passing the heat absorber, and a control device, and this control device switches between and executes a first operation mode to close the first opening/closing valve, open the second opening/closing valve, thereby let the refrigerant discharged from the compressor radiate heat in the radiator, decompress the refrigerant from which the heat has been radiated, through the outdoor expansion valve, let the refrigerant absorb heat in the outdoor heat exchanger, send, to the accumulator, the refrigerant flowing out from this outdoor heat exchanger, and suck the refrigerant from this accumulator into the compressor, and a second operation mode to open the first opening/closing valve, close the second opening/closing valve, thereby decompress the refrigerant flowing out from the outdoor heat exchanger through the indoor expansion valve, let the refrigerant absorb heat in the heat absorber, send, to the accumulator, the refrigerant flowing out from this heat absorber, and suck the refrigerant from this accumulator into the compressor. In the vehicle air conditioning device, when the control device starts the compressor in the second operation mode, the second opening/closing valve is opened for a predetermined period of time after the start. Consequently, when starting the compressor in the second operation mode, a large amount of refrigerant can be returned to the accumulator through the second opening/closing valve, and the inside of the accumulator can be stirred.

In consequence, the stable state in the accumulator can similarly be broken, and hence it is possible to prevent or inhibit the occurrence of the bumping which occurs when the pressure in the accumulator drops in the stable state like the state of closing the upside of the liquid refrigerant with the lid of the oil. Furthermore, it is possible to effectively eliminate or inhibit the liquid compression in the compressor and the generation of the noise in the accumulator, it is possible to enhance the reliability of the vehicle air conditioning device, and it is possible to effectively improve the comfort of the passengers.

According to the invention of claim 3, in addition to the above respective inventions, when shifting from the first operation mode to the second operation mode or when starting the compressor in the second operation mode, the control device opens the outdoor expansion valve in a state where the second opening/closing valve is opened, and operate the compressor. Consequently, a larger amount of refrigerant can flow into the accumulator, and it is possible to further promote the stirring of the inside.

Here, as in the invention of claim 4, the vehicle air conditioning device includes a bypass pipe bypassing the radiator and the outdoor expansion valve, to send, directly into the outdoor heat exchanger, the refrigerant discharged from the compressor, a third opening/closing valve to send the refrigerant discharged from the compressor to the radiator, a fourth opening/closing valve to send the refrigerant discharged from the compressor to the bypass pipe, and an auxiliary heating device to heat the air to be supplied from the air flow passage to the vehicle interior, the first operation mode is a heating mode, and in this heating mode, the control device opens the third opening/closing valve and closes the fourth opening/closing valve, and the second operation mode includes any one, any combination or all of a dehumidifying and heating mode to close the third opening/closing valve and the outdoor expansion valve, open the fourth opening/closing valve, thereby send the refrigerant discharged from the compressor from the bypass pipe to the outdoor heat exchanger, let the refrigerant radiate heat, decompress the refrigerant from which the heat has been radiated, through the indoor expansion valve, let the refrigerant absorb heat in the heat absorber, and generate heat in the auxiliary heating device, a dehumidifying and cooling mode to open the third opening/closing valve, close the fourth opening/closing valve, thereby send the refrigerant discharged from the compressor from the radiator to the outdoor heat exchanger, let the refrigerant radiate heat in the radiator and the outdoor heat exchanger, decompress the refrigerant from which the heat has been radiated, through the indoor expansion valve, and then let the refrigerant absorb heat in the heat absorber, a cooling mode to open the third opening/closing valve, close the fourth opening/closing valve, thereby send the refrigerant discharged from the compressor from the radiator to the outdoor heat exchanger, let the refrigerant radiate heat in the outdoor heat exchanger, decompress the refrigerant from which the heat has been radiated, through the indoor expansion valve, and then let the refrigerant absorb heat in the heat absorber, and a maximum cooling mode to close the third opening/closing valve and the outdoor expansion valve, open the fourth opening/closing valve, thereby send the refrigerant discharged from the compressor from the bypass pipe to the outdoor heat exchanger, let the refrigerant radiate heat, decompress the refrigerant from which the heat has been radiated, through the indoor expansion valve, and then let the refrigerant absorb heat in the heat absorber. At this time, as in the invention of claim 5, the second operation mode includes the dehumidifying and cooling mode and/or the cooling mode. In this case, a refrigerant scavenging operation during the shifting from the heating mode to the dehumidifying and cooling mode or the cooling mode is unnecessary. Consequently, during the shifting from the heating mode to the dehumidifying and cooling mode or the cooling mode, when the second opening/closing valve is opened for the predetermined period of time after the shift, any noise is not generated in the second opening/closing valve. Therefore, it is possible to effectively stir the inside of the accumulator in a comparatively short time and it is possible to prevent the bumping, while avoiding the generation of the noise in the second opening/closing valve.

MODE FOR CARRYING OUT THE INVENTION

Hereinafter, description will be made as to embodiments of the present invention in detail with reference to the drawings.

Figure 1:
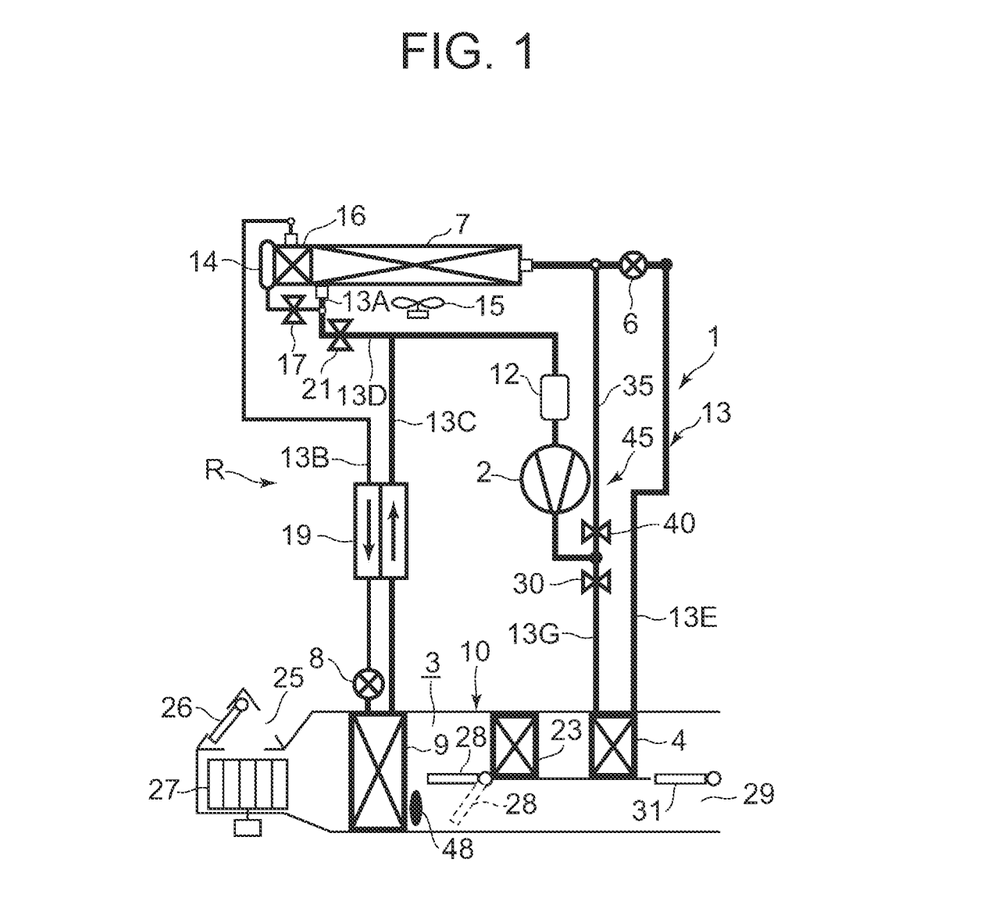
FIG. 1 is a constitutional view of a vehicle air conditioning device of an embodiment to which the present invention is applied (a heating mode, a dehumidifying and heating mode, a dehumidifying and cooling mode, and a cooling mode)

FIG. 1 shows a constitutional view of a vehicle air conditioning device 1 of one embodiment of the present invention. A vehicle of the embodiment to which the present invention is applied is an electric vehicle (EV) in which an engine (an internal combustion engine) is not mounted, and runs with an electric motor for running which is driven by power charged in a battery (which is not shown in the drawing), and the vehicle air conditioning device 1 of the present invention is also driven by the power of the battery. Specifically, in the electric vehicle which is not capable of performing heating by engine waste heat, the vehicle air conditioning device 1 of the embodiment performs a heating mode by a heat pump operation in which a refrigerant circuit is used, and furthermore, the conditioning device selectively executes respective operation modes of a dehumidifying and heating mode, a dehumidifying and cooling mode, a cooling mode, and a MAX cooling mode (the maximum cooling mode).

It is to be noted that the vehicle is not limited to the electric vehicle, and the present invention is also effective for a so-called hybrid car in which the engine is used together with the electric motor for running. Furthermore, needless to say, the present invention is also applicable to a usual car which runs with the engine. Additionally, the above heating mode is a first operation mode in the present invention, and the dehumidifying and heating mode, the dehumidifying and cooling mode, the cooling mode and the MAX cooling mode are included in a second operation mode of the present invention.

The vehicle air conditioning device 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant, a radiator 4 disposed in an air flow passage 3 of an HVAC unit 10 in which vehicle interior air passes and circulates, to send inside the high-temperature high-pressure refrigerant discharged from the compressor 2 via a refrigerant pipe 13G and let this refrigerant radiate heat in the vehicle interior, an outdoor expansion valve 6 constituted of an electric valve which decompresses and expands the refrigerant during the heating, an outdoor heat exchanger 7 which is disposed outside the vehicle interior and performs heat exchange between the refrigerant and outdoor air to function as the radiator during the cooling and to function as an evaporator during the heating, an indoor expansion valve 8 constituted of an electric valve to decompress and expand the refrigerant, a heat absorber 9 disposed in the air flow passage 3 to let the refrigerant absorb heat from interior and exterior of the vehicle during the cooling and during the dehumidifying, an accumulator 12, and others, thereby constituting a refrigerant circuit R.

Furthermore, this refrigerant circuit R is charged with a predetermined amount of refrigerant and a predetermined amount of lubricating oil. It is to be noted that an outdoor blower 15 is provided in the outdoor heat exchanger 7. The outdoor blower 15 forcibly sends the outdoor air through the outdoor heat exchanger 7 to perform the heat exchange between the outdoor air and the refrigerant, whereby the outdoor air passes through the outdoor heat exchanger 7 also during stopping of the vehicle (i.e., a velocity is 0 km/h).

Additionally, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve 17 (a first opening/closing valve) to be opened during the cooling, and a refrigerant pipe 13B on an outlet side of the subcooling portion 16 is connected to an inlet side of the heat absorber 9 via the indoor expansion valve 8. It is to be noted that the receiver drier portion 14 and the subcooling portion 16 structurally constitute a part of the outdoor heat exchanger 7.

In addition, the refrigerant pipe 13B between the subcooling portion 16 and the indoor expansion valve 8 is disposed in a heat exchange relation with a refrigerant pipe 13C on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9.

Furthermore, the refrigerant pipe 13A extending out from the outdoor heat exchanger 7 branches to a refrigerant pipe 13D, and this branching refrigerant pipe 13D communicates and connects with the refrigerant pipe 13C on a downstream side of the internal heat exchanger 19 via a solenoid valve 21 (a second opening/closing valve) to be opened during the heating. The refrigerant pipe 13C is connected to the accumulator 12, and the accumulator 12 is connected to a refrigerant suction side of the compressor 2. Additionally, a refrigerant pipe 13E on an outlet side of the radiator 4 is connected to an inlet side of the outdoor heat exchanger 7 via the outdoor expansion valve 6.

In addition, a solenoid valve 30 (a third opening/closing valve) to be closed during the dehumidifying and heating and MAX cooling described later is disposed in the refrigerant pipe 13G between a discharge side of the compressor 2 and an inlet side of the radiator 4. In this case, the refrigerant pipe 13G branches to a bypass pipe 35 on an upstream side of the solenoid valve 30, and this bypass pipe 35 communicates and connects with the refrigerant pipe 13E on a downstream side of the outdoor expansion valve 6 via a solenoid valve 40 (a fourth opening/closing valve) which is to be opened during the dehumidifying and heating and MAX cooling. The bypass pipe 35, the solenoid valve 30 and the solenoid valve 40 constitute a bypass device 45.

Thus, the bypass pipe 35, the solenoid valve 30 and the solenoid valve 40 constitute the bypass device 45, so that it is possible to smoothly change from the dehumidifying and heating mode or the MAX cooling mode to send, directly into the outdoor heat exchanger 7, the refrigerant discharged from the compressor 2 as described later, to the heating mode, the dehumidifying and cooling mode or the cooling mode to send, into the radiator 4, the refrigerant discharged from the compressor 2.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor or outdoor air to the air flow passage 3.

Additionally, in FIG. 1, reference numeral 23 denotes an auxiliary heater as an auxiliary heating device disposed in the vehicle air conditioning device 1 of the embodiment. The auxiliary heater 23 of the embodiment is constituted of a PTC heater which is an electric heater, and disposed in the air flow passage 3 on an air upstream side of the radiator 4 to the flow of the air in the air flow passage 3. Then, when the auxiliary heater 23 is energized to generate heat, the air in the air flow passage 3 which flows into the radiator 4 through the heat absorber 9 is heated. That is, the auxiliary heater 23 becomes a so-called heater core to perform or complement the heating of the vehicle interior.

Furthermore, in the air flow passage 3 on an air upstream side of the auxiliary heater 23, an air mix damper 28 is disposed to adjust a degree at which the air (the indoor or outdoor air) in the air flow passage 3, flowing into the air flow passage 3 and passed through the heat absorber 9, passes through the auxiliary heater 23 and the radiator 4. Further in the air flow passage 3 on an air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
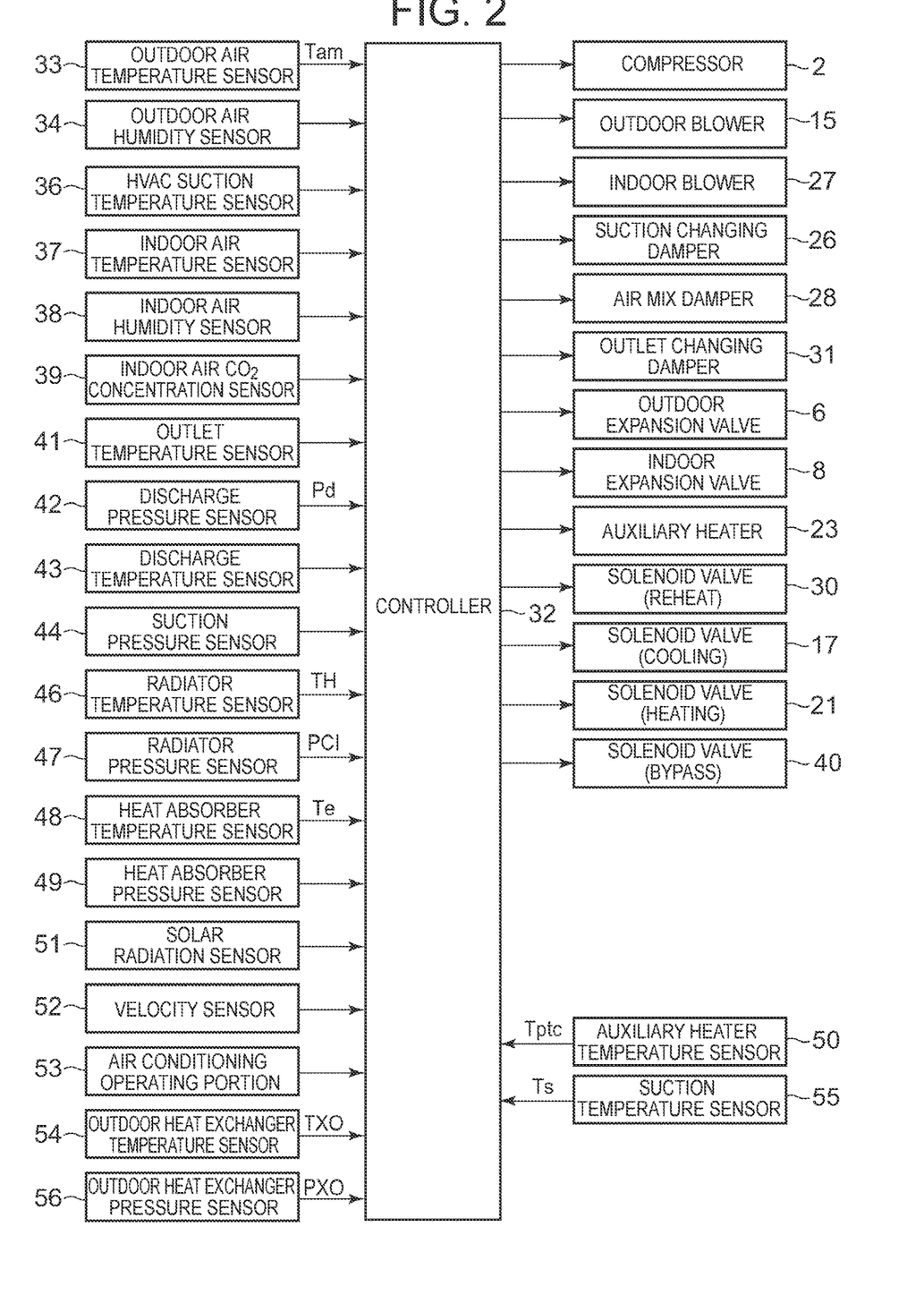
FIG. 2 is a block diagram of an electric circuit of a controller of the vehicle air conditioning device of FIG. 1.

Next, in FIG. 2, reference numeral 32 denotes a controller (ECU) as a control device constituted of a microcomputer which is an example of a computer including a processor, and an input of the controller 32 is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction pressure sensor 44 which detects a pressure of the refrigerant to be sucked into the compressor 2, a suction temperature sensor 55 which detects a temperature of the refrigerant to be sucked into the compressor 2, a radiator temperature sensor 46 which detects a temperature of the radiator 4 (the temperature of the air passed through the radiator 4 or the temperature of the radiator 4 itself: a radiator temperature TH), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the switching between operation modes, an outdoor heat exchanger temperature sensor 54 which detects a temperature of the outdoor heat exchanger 7 (the temperature immediately after the refrigerant flows out from the outdoor heat exchanger 7, or the temperature of the outdoor heat exchanger 7 itself: an outdoor heat exchanger temperature TXO), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7: an outdoor heat exchanger pressure PXO). Furthermore, the input of the controller 32 is further connected to an output of an auxiliary heater temperature sensor 50 which detects a temperature of the auxiliary heater 23 (the temperature immediately after the air is heated by the auxiliary heater 23 or the temperature of the auxiliary heater 23: an auxiliary heater temperature Tptc).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the auxiliary heater 23, and the respective solenoid valves, i.e., the solenoid valve 30 (for reheating), the solenoid valve 17 (for the cooling), the solenoid valve 21 (for the heating) and the solenoid valve 40 (for bypass). Then, the controller 32 controls these components on the basis of the outputs of the respective sensors and the setting input by the air conditioning operating portion 53.

Next, description will be made as to an operation of the vehicle air conditioning device 1 of the embodiment having the above constitution. In the embodiment, the controller 32 switches among and executes the respective operation modes of the heating mode, the dehumidifying and heating mode, the dehumidifying and cooling mode, the cooling mode and the MAX cooling mode (the maximum cooling mode). Description will initially be made as to a flow of the refrigerant and an outline of control in each operation mode.

(1) Heating Mode (First Operation Mode)

When the heating mode is selected by the controller 32 (an automatic mode) or a manual operation to the air conditioning operating portion 53 (a manual mode), the controller 32 opens the solenoid valve 21 for the heating (the second opening/closing valve) and closes the solenoid valve 17 for the cooling (the first opening/closing valve). Furthermore, the controller opens the solenoid valve 30 for the reheating and closes the solenoid valve 40 for the bypass.

Then, the controller operates the compressor 2 and the respective blowers 15 and 27, and the air mix damper 28 has a state of sending, to the auxiliary heater 23 and the radiator 4, all the air in the air flow passage 3 that is blown out from the indoor blower 27 and passed through the heat absorber 9 as shown by a broken line in FIG. 1. In consequence, a high-temperature high-pressure gas refrigerant discharged from the compressor 2 flows into the radiator 4 through the solenoid valve 30 and the refrigerant pipe 13G. The air in the air flow passage 3 passes through the radiator 4, and hence the air in the air flow passage 3 heats by the high-temperature refrigerant in the radiator 4 (in the auxiliary heater 23 and the radiator 4, when the auxiliary heater 23 operates), whereas the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21 and the refrigerant pipe 13D, and flows from the refrigerant pipe 13C into the accumulator 12 to perform gas-liquid separation therein, and then the gas refrigerant is sucked into the compressor 2, thereby repeating this circulation. That is, the refrigerant flowing out from the outdoor heat exchanger 7 flows through the accumulator 12 without passing the heat absorber 9. Then, the air heated in the radiator 4 (in the auxiliary heater 23 and the radiator 4, when the auxiliary heater 23 operates) is blown out from the outlet 29, thereby performing the heating of the vehicle interior.

The controller 32 calculates a target radiator pressure PCO (a target value of the radiator pressure PCI) from a target radiator temperature TCO (a target value of the radiator temperature TH) calculated from an after-mentioned target outlet temperature TAO, and controls a number of revolution of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Furthermore, the controller 32 controls a valve position of the outdoor expansion valve 6 on the basis of the temperature (the radiator temperature TH) of the radiator 4 which is detected by the radiator temperature sensor 46 and the radiator pressure PCI detected by the radiator pressure sensor 47, and controls a subcool degree SC of the refrigerant in an outlet of the radiator 4. The target radiator temperature TCO is basically TCO=TAO, but a predetermined limit of controlling is provided.

Furthermore, in this heating mode, when a heating capability by the radiator 4 runs short to a heating capability required for vehicle interior air conditioning, the controller 32 controls the energization of the auxiliary heater 23 to complement the shortage by the heat generation of the auxiliary heater 23. In consequence, comfortable vehicle interior heating is achieved, and frosting of the outdoor heat exchanger 7 is inhibited. At this time, the auxiliary heater 23 is disposed on the air upstream side of the radiator 4, and hence the air flowing through the air flow passage 3 is passed through the auxiliary heater 23 before the radiator 4.

Here, if the auxiliary heater 23 is disposed on the air downstream side of the radiator 4 and when the auxiliary heater 23 is constituted of the PTC heater as in the embodiment, the temperature of the air flowing into the auxiliary heater 23 rises due to the radiator 4. Therefore, a resistance value of the PTC heater increases, and a current value decreases to also decrease an amount of heat to be generated, but the auxiliary heater 23 is disposed on the air upstream side of the radiator 4, so that it is possible to sufficiently exert a capability of the auxiliary heater 23 constituted of the PTC heater as in the embodiment.

(2) Dehumidifying and Heating Mode (Second Operation Mode)

Next, in the dehumidifying and heating mode, the controller 32 opens the solenoid valve 17 and closes the solenoid valve 21. Furthermore, the controller closes the solenoid valve 30, opens the solenoid valve 40, and adjusts the valve position of the outdoor expansion valve 6 to a shutoff position. Then, the controller operates the compressor 2 and the respective blowers 15 and 27. As shown by the broken line in FIG. 1, the air mix damper 28 achieves a state of sending, to the auxiliary heater 23 and the radiator 4, all the air in the air flow passage 3 that is blown out from the indoor blower 27 and passed through the heat absorber 9.

In consequence, the high-temperature high-pressure gas refrigerant discharged from the compressor 2 to the refrigerant pipe 13G flows into the bypass pipe 35 without flowing toward the radiator 4, and flows through the solenoid valve 40 to reach the refrigerant pipe 13E on the downstream side of the outdoor expansion valve 6. At this time, the outdoor expansion valve 6 is shut off, and hence the refrigerant flows into the outdoor heat exchanger 7. The refrigerant flowing into the outdoor heat exchanger 7 is cooled by running therein or the outdoor air passed through the outdoor blower 15, to condense. The refrigerant flowing out from the outdoor heat exchanger 7 flows from the refrigerant pipe 13A through the solenoid valve 17 successively into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. In the indoor expansion valve 8, the refrigerant is decompressed, and then flows into the heat absorber 9 to evaporate. By a heat absorbing operation at this time, the air blown out from the indoor blower 27 is cooled, and water in the air coagulates to adhere to the heat absorber 9. Therefore, the air in the air flow passage 3 is cooled and dehumidified. The refrigerant evaporated in the heat absorber 9 flows through the internal heat exchanger 19 and the refrigerant pipe 13C to reach the accumulator 12, and flows therethrough to be sucked into the compressor 2, thereby repeating the circulation.

At this time, the valve position of the outdoor expansion valve 6 is adjusted to the shutoff position, so that it is possible to inhibit or prevent the disadvantage that the refrigerant discharged from the compressor 2 flows from the outdoor expansion valve 6 back into the radiator 4. Consequently, it is possible to inhibit or eliminate decrease of an amount of the refrigerant to be circulated, thereby acquiring an air conditioning capability. Furthermore, in this dehumidifying and heating mode, the controller 32 energizes the auxiliary heater 23 to generate heat. Consequently, the air cooled and dehumidified in the heat absorber 9 is further heated in a process of passing the auxiliary heater 23, and hence a temperature rises, thereby performing the dehumidifying and heating of the vehicle interior.

The controller 32 controls the number of revolution of the compressor 2 on the basis of the temperature (the heat absorber temperature Te) of the heat absorber 9 which is detected by the heat absorber temperature sensor 48 and a target heat absorber temperature TEO that is a target value of the heat absorber temperature, and the controller controls the energization (the heat generation) of the auxiliary heater 23 on the basis of the auxiliary heater temperature Tptc detected by the auxiliary heater temperature sensor 50 and the above-mentioned target radiator temperature TCO. Consequently, the drop of the temperature of the air blown out from the outlet 29 to the vehicle interior is accurately prevented by the heating of the auxiliary heater 23, while appropriately performing the cooling and dehumidifying of the air in the heat absorber 9.

In consequence, the temperature of the air blown out to the vehicle interior can be controlled at an appropriate heating temperature while dehumidifying the air, and it is possible to achieve comfortable and efficient dehumidifying and heating of the vehicle interior. Furthermore, as described above, in the dehumidifying and heating mode, the air mix damper 28 has a state of sending, through the auxiliary heater 23 and the radiator 4, all the air in the air flow passage 3. Therefore, the air passed through the heat absorber 9 is efficiently heated by the auxiliary heater 23, thereby improving energy saving properties, and controllability of the air conditioning for the dehumidifying and heating can improve.

It is to be noted that the auxiliary heater 23 is disposed on the air upstream side of the radiator 4, and hence the air heated by the auxiliary heater 23 passes through the radiator 4. However, in this dehumidifying and heating mode, the refrigerant does not flow through the radiator 4, and hence it is possible to eliminate the disadvantage that heat is absorbed, by the radiator 4, from the air heated by the auxiliary heater 23. Specifically, it is possible to inhibit the temperature drop of the air blown out to the vehicle interior by the radiator 4, and a coefficient of performance (COP) improves.

(3) Dehumidifying and Cooling Mode (Second Operation Mode)

Next, in the dehumidifying and cooling mode, the controller 32 opens the solenoid valve 17 and closes the solenoid valve 21. The controller also opens the solenoid valve 30 and closes the solenoid valve 40. Then, the controller operates the compressor 2 and the respective blowers 15 and 27, and the air mix damper 28 has the state of sending, through the auxiliary heater 23 and the radiator 4, all the air in the air flow passage 3 that is blown out from the indoor blower 27 and passed through the heat absorber 9 as shown by the broken line in FIG. 1. Consequently, the high-temperature high-pressure gas refrigerant discharged from the compressor 2 flows through the solenoid valve 30 and flows from the refrigerant pipe 13G into the radiator 4. The air in the air flow passage 3 passes through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. In this dehumidifying and cooling mode, the controller 32 does not energize the auxiliary heater 23, and hence the air cooled and dehumidified in the heat absorber 9 is reheated in the process of passing the radiator 4 (a radiation capability is lower than that during the heating). Consequently, the dehumidifying and cooling of the vehicle interior is performed.

The controller 32 controls the number of revolution of the compressor 2 on the basis of the temperature of the heat absorber 9 (the heat absorber temperature Te) which is detected by the heat absorber temperature sensor 48, also controls the valve position of the outdoor expansion valve 6 on the basis of the above-mentioned high pressure of the refrigerant circuit R, and controls the refrigerant pressure of the radiator 4 (the radiator pressure PCI).

(4) Cooling Mode (Second Operation Mode)

Next, in the cooling mode, the controller 32 adjusts the valve position of the outdoor expansion valve 6 to a fully opened position in the above state of the dehumidifying and cooling mode. It is to be noted that the controller 32 controls the air mix damper 28 to adjust a ratio at which the air in the air flow passage 3, blown out from the indoor blower 27 and passed through the heat absorber 9, passes through the auxiliary heater 23 and the radiator 4 as shown by a solid line in FIG. 1. Furthermore, the controller 32 does not energize the auxiliary heater 23.

In consequence, the high-temperature high-pressure gas refrigerant discharged from the compressor 2 flows through the solenoid valve 30 and flows from the refrigerant pipe 13G into the radiator 4, and the refrigerant flowing out from the radiator 4 flows through the refrigerant pipe 13E to reach the outdoor expansion valve 6. At this time, the outdoor expansion valve 6 is fully opened, and hence the refrigerant passes the outdoor expansion valve to flow into the outdoor heat exchanger 7 as it is, in which the refrigerant is cooled by the running therein or the outdoor air passed through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. The refrigerant is decompressed in the indoor expansion valve 8 and then flows into the heat absorber 9 to evaporate. By the heat absorbing operation at this time, the air blown out from the indoor blower 27 is cooled. Furthermore, the water in the air coagulates to adhere to the heat absorber 9.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. The air cooled and dehumidified in the heat absorber 9 is blown out from the outlet 29 to the vehicle interior (a part of the air passes the radiator 4 to perform heat exchange), thereby performing the cooling of the vehicle interior. In this cooling mode, the controller 32 also controls the number of revolution of the compressor 2 on the basis of the temperature of the heat absorber 9 (the heat absorber temperature Te) which is detected by the heat absorber temperature sensor 48 and the target heat absorber temperature TEO that is the target value of the heat absorber temperature.

(5) MAX Cooling Mode (Maximum Cooling Mode: Second Operation Mode)

Figure 3:
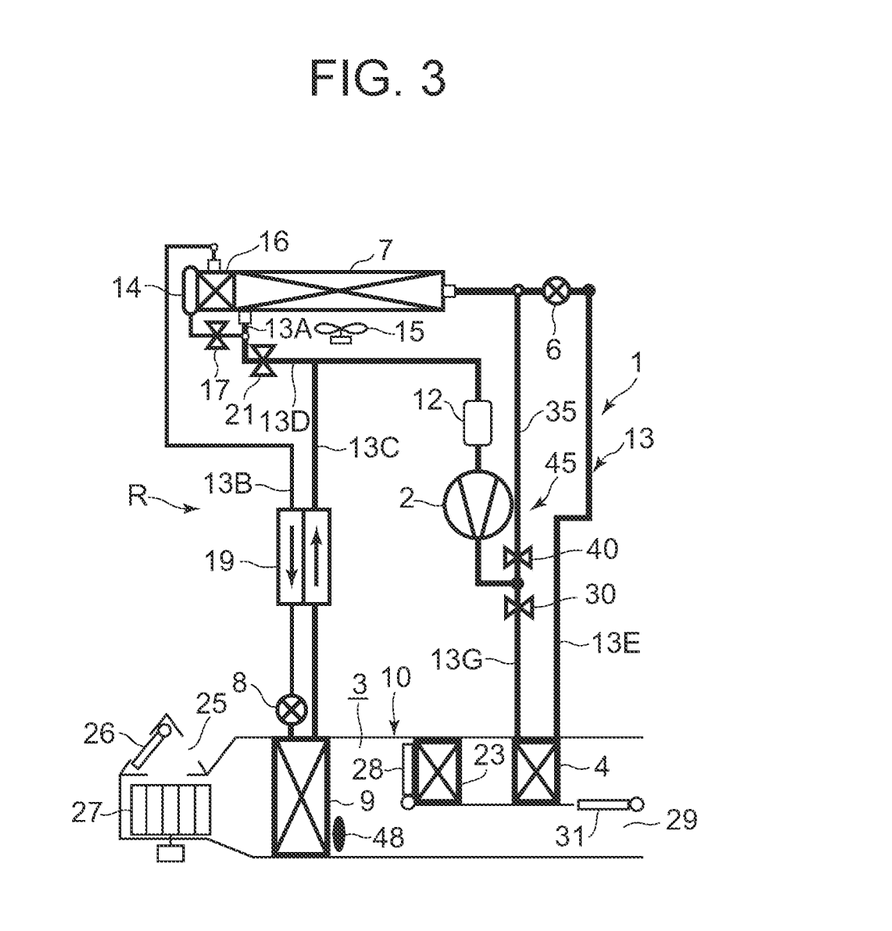
FIG. 3 is a constitutional view when the vehicle air conditioning device of FIG. 1 is in a MAX cooling mode (the maximum cooling mode)

Next, in the MAX cooling mode that is the maximum cooling mode, the controller 32 opens the solenoid valve 17 and closes the solenoid valve 21. The controller also closes the solenoid valve 30, opens the solenoid valve 40, and adjusts the valve position of the outdoor expansion valve 6 to the shutoff position. Then, the controller operates the compressor 2 and the respective blowers 15 and 27, and the air mix damper 28 has a state where the air in the air flow passage 3 does not pass through the auxiliary heater 23 and the radiator 4 as shown in FIG. 3. However, even when the air slightly passes, there are not any problems. Furthermore, the controller 32 does not energize the auxiliary heater 23.

In consequence, the high-temperature high-pressure gas refrigerant discharged from the compressor 2 to the refrigerant pipe 13G flows into the bypass pipe 35 without flowing toward the radiator 4, and flows through the solenoid valve 40 to reach the refrigerant pipe 13E on the downstream side of the outdoor expansion valve 6. At this time, the outdoor expansion valve 6 is shut off, and hence the refrigerant flows into the outdoor heat exchanger 7. The refrigerant flowing into the outdoor heat exchanger 7 is cooled by running therein or the outdoor air passed through the outdoor blower 15, to condense. The refrigerant flowing out from the outdoor heat exchanger 7 flows from the refrigerant pipe 13A through the solenoid valve 17 successively into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. In the indoor expansion valve 8, the refrigerant is decompressed and then flows into the heat absorber 9 to evaporate. By the heat absorbing operation at this time, the air blown out from the indoor blower 27 is cooled. Furthermore, the water in the air coagulates to adhere to the heat absorber 9, and hence the air in the air flow passage 3 is dehumidified. The refrigerant evaporated in the heat absorber 9 flows through the internal heat exchanger 19 and the refrigerant pipe 13C to reach the accumulator 12, and flows therethrough to be sucked into the compressor 2, thereby repeating the circulation. At this time, the outdoor expansion valve 6 is shut off, so that it is similarly possible to inhibit or prevent the disadvantage that the refrigerant discharged from the compressor 2 flows from the outdoor expansion valve 6 back into the radiator 4. Consequently, it is possible to inhibit or eliminate the decrease of the amount of the refrigerant to be circulated, and it is possible to acquire the air conditioning capability.

Here, in the above-mentioned cooling mode, the high-temperature refrigerant flows through the radiator 4, and hence direct heat conduction from the radiator 4 to the HVAC unit 10 considerably occurs, but the refrigerant does not flow through the radiator 4 in this MAX cooling mode. Therefore, the air from the heat absorber 9 in the air flow passage 3 is not heated by heat transmitted from the radiator 4 to the HVAC unit 10. Consequently, powerful cooling of the vehicle interior is performed, and especially under an environment where the outdoor air temperature Tam is high, the vehicle interior can rapidly be cooled to achieve the comfortable air conditioning of the vehicle interior. Also in this MAX cooling mode, the controller 32 controls the number of revolution of the compressor 2 on the basis of the temperature of the heat absorber 9 (the heat absorber temperature Te) which is detected by the heat absorber temperature sensor 48 and the target heat absorber temperature TEO that is the target value of the heat absorber temperature.

(6) Switching Between Operation Modes

The air circulated in the air flow passage 3 is subjected to the cooling from the heat absorber 9 and a heating operation from the radiator 4 (and the auxiliary heater 23) (adjusted by the air mix damper 28) in the above respective operation modes, and the air is blown out from the outlet 29 into the vehicle interior. The controller 32 calculates the target outlet temperature TAO on the basis of the outdoor air temperature Tam detected by the outdoor air temperature sensor 33, the temperature of the vehicle interior which is detected by the indoor air temperature sensor 37, the blower voltage, the solar radiation amount detected by the solar radiation sensor 51 and others, and the target vehicle interior temperature (the predetermined temperature) set in the air conditioning operating portion 53. The controller switches among the respective operation modes, and controls the temperature of the air blown out from the outlet 29 at this target outlet temperature TAO.

In this case, the controller 32 changes from the heating mode to the dehumidifying and heating mode, from the dehumidifying and heating mode to the dehumidifying and cooling mode, from the dehumidifying and cooling mode to the cooling mode, from the cooling mode to the MAX cooling mode, from this MAX cooling mode to the cooling mode, from the cooling mode to the dehumidifying and cooling mode, from the dehumidifying and cooling mode to the dehumidifying and heating mode, and from the dehumidifying and heating mode to the heating mode on the basis of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, and presence/absence of requirement for the dehumidifying of the vehicle interior. Furthermore, there is also a case where the controller changes from the heating mode to the dehumidifying and cooling mode or the cooling mode, and from the dehumidifying and cooling mode or the cooling mode to the heating mode. In the embodiment, the controller changes the respective operation modes as described above, to accurately switch among the heating mode, the dehumidifying and heating mode, the dehumidifying and cooling mode, the cooling mode and the MAX cooling mode in accordance with environment conditions or necessity for the dehumidifying, thereby achieving comfortable and efficient air conditioning of the vehicle interior.

(7) Refrigerant Scavenging Operation

It is to be noted that as described above, in the dehumidifying and heating mode, the controller closes the solenoid valve 30 and also shuts off the outdoor expansion valve 6, thereby reaching a state where any refrigerant is not sent through the radiator 4. Consequently, when the heating mode is changed to the dehumidifying and heating mode, the refrigerant remaining in the radiator 4 is laid up therein for a long time, and the amount of the refrigerant to be circulated decreases.

To eliminate the problem, the controller 32 executes a refrigerant scavenging operation when changing from the heating mode to the dehumidifying and heating mode in the embodiment. When changing from the heating mode to the dehumidifying and heating mode in this refrigerant scavenging operation, the controller 32 closes the solenoid valve 21, and opens the solenoid valve 17 to shift to the dehumidifying and heating mode, and then enlarges (e.g., fully opens) the valve position of the outdoor expansion valve 6 for a predetermined time before switching the solenoid valve 30 and the solenoid valve 40. This state is similar to the state of the cooling mode. Furthermore, in the embodiment, a number of revolution NC of the compressor 2 is lowly maintained (e.g., the minimum number of revolution of controlling).

Consequently, the refrigerant present in a region from the solenoid valve 30 to the outdoor expansion valve 6 which includes the radiator 4 is expelled in a direction of the outdoor heat exchanger 7 (scavenging). Then, after elapse of a predetermined period of time, the controller closes the solenoid valve 30, opens the solenoid valve 40, and closes the outdoor expansion valve 6 toward the shutoff position. Thus, the outdoor expansion valve 6 is shut off, and then the controller 32 shifts to a state of controlling the number of revolution of the compressor 2 in an operation range of the dehumidifying and heating mode. By such a refrigerant scavenging operation, the refrigerant is prevented from being laid up for a long time in the radiator 4, and the amount of the refrigerant to be circulated in the refrigerant circuit R is acquired to prevent deterioration of an air conditioning performance.

(8) Bumping Preventing Control

Here, as described above, the refrigerant and oil flowing out from the compressor 2 through the refrigerant circuit R flow into the accumulator 12 when the compressor 2 is stopped, their liquid part is accumulated in the accumulator 12, and the oil having a smaller specific weight forms a layer on the liquid refrigerant, thereby bringing about a stable state like a state of being closed with a lid. Particularly, in the heating mode, there increase amounts of the liquid refrigerant and oil which flow out from the outdoor heat exchanger 7 through the solenoid valve 21 into the accumulator 12 and are accumulated therein.

In this state, when the operation mode changes from the heating mode to the dehumidifying and cooling mode or the cooling mode, the refrigerant flowing out from the outdoor heat exchanger 7 flows from the solenoid valve 17 in a direction of the indoor expansion valve 8. Then, the compressor 2 sucks the refrigerant in the accumulator 12, and hence a pressure in the accumulator 12 rapidly drops. Then, bumping occurs where the refrigerant below the oil boils and vaporizes without stopping, and intensely breaks through the upper oil layer, thereby causing excessive liquid return to the compressor 2 and generating sound (noise). Furthermore, there is similarly a risk of such bumping also when the compressor 2 starts in the dehumidifying and cooling mode or the cooling mode in which the refrigerant flowing out from the outdoor heat exchanger 7 flows from the indoor expansion valve 8 in a direction of the heat absorber 9. To eliminate such a problem, the controller 32 executes bumping preventing control which will be described below, when changing from the heating mode to the dehumidifying and cooling mode or the cooling mode or when starting the compressor 2 in the dehumidifying and cooling mode or the cooling mode.

Figure 4:
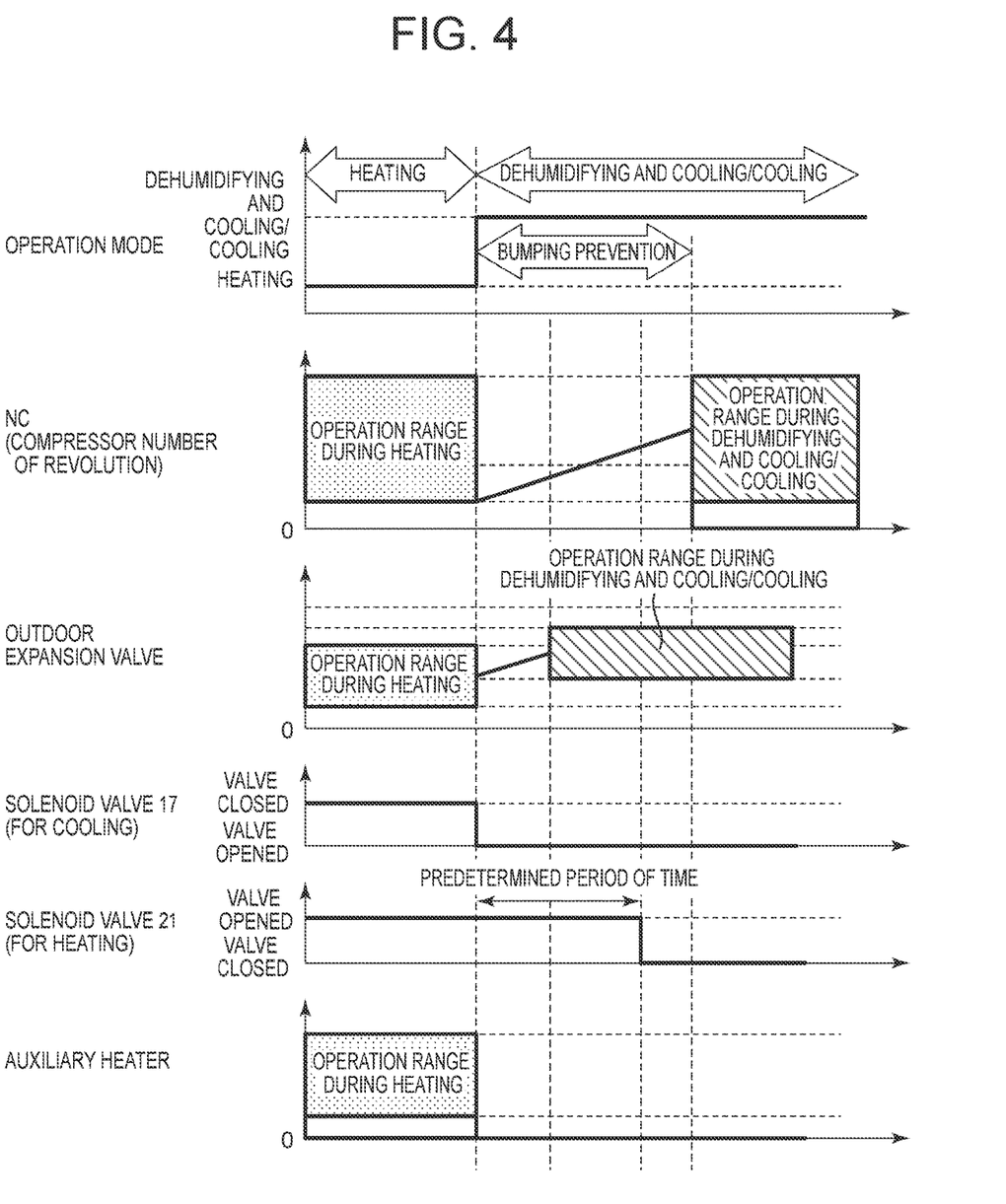
FIG. 4 is a timing chart of each device to explain an example of bumping preventing control to be executed by the controller of FIG. 2 when changing from the heating mode to the dehumidifying and cooling mode or the cooling mode.

(8-1) Bumping Preventing Control at Change from Heating Mode to Dehumidifying and Cooling Mode or Cooling Mode Firstly, description will be made as to an example of the bumping preventing control to be executed by the controller 32 when changing the operation mode of the vehicle air conditioning device 1 from the above-mentioned heating mode (the first operation mode) to the dehumidifying and cooling mode or the cooling mode (the second operation mode), with reference to FIG. 4. A timing chart of FIG. 4 shows the number of revolution NC of the compressor 2, the valve position of the outdoor expansion valve 6, and states of the solenoid valve 17, the solenoid valve 21, and the auxiliary heater 23, when the heating mode shifts to the dehumidifying and cooling mode or the cooling mode.

The controller 32 opens the solenoid valve 17 for the cooling, to shift from the heating mode to the dehumidifying and cooling mode or the cooling mode, and then maintains a state where the solenoid valve 21 for the heating is opened without being closed, for a predetermined period of time. Furthermore, also in this period of time, the controller opens the outdoor expansion valve 6 to enlarge its valve position from an operation range of the heating mode to an operation range of the dehumidifying and cooling mode/the cooling mode, and the compressor 2 also continues its operation to raise the number of revolution NC from the operation range of the heating mode to the operation range of the dehumidifying and cooling mode/the cooling mode.

Then, after elapse of the predetermined period of time, the controller 32 closes the solenoid valve 21. It is to be noted that in the period of time until the operation range of the compressor 2 shifts to the operation range of the dehumidifying and cooling mode/the cooling mode, the controller executes the bumping preventing control in the embodiment.

Thus, when the controller 32 shifts from the heating mode to the dehumidifying and cooling mode or the cooling mode, the solenoid valve 21 for the heating (the second opening/closing valve) is opened for the predetermined period of time after the shift. Consequently, when changing from the heating mode to the dehumidifying and cooling mode or the cooling mode, a large amount of refrigerant can be returned to the accumulator 12 through the solenoid valve 21, and the inside of the accumulator can be stirred.

In consequence, the stable state in the accumulator 12 can be broken, and hence it is possible to prevent or inhibit the occurrence of the bumping which occurs when the pressure in the accumulator 12 drops in the stable state like a state of closing the upside of a liquid refrigerant with a lid of oil. Furthermore, it is possible to effectively eliminate or inhibit liquid compression in the compressor 2 and the generation of the noise in the accumulator 12, it is possible to enhance reliability of the vehicle air conditioning device 1, and it is possible to effectively improve the comfort of the passengers.

Furthermore, when the controller 32 shifts from the heating mode to the dehumidifying and cooling mode or the cooling mode, the controller opens the outdoor expansion valve 6 and enlarges its valve position in the state where the solenoid valve 21 is opened, and the compressor 2 also continues its operation. Consequently, a larger amount of refrigerant can flow into the accumulator 12, and it is possible to further promote the stirring of the inside.

Figure 5:
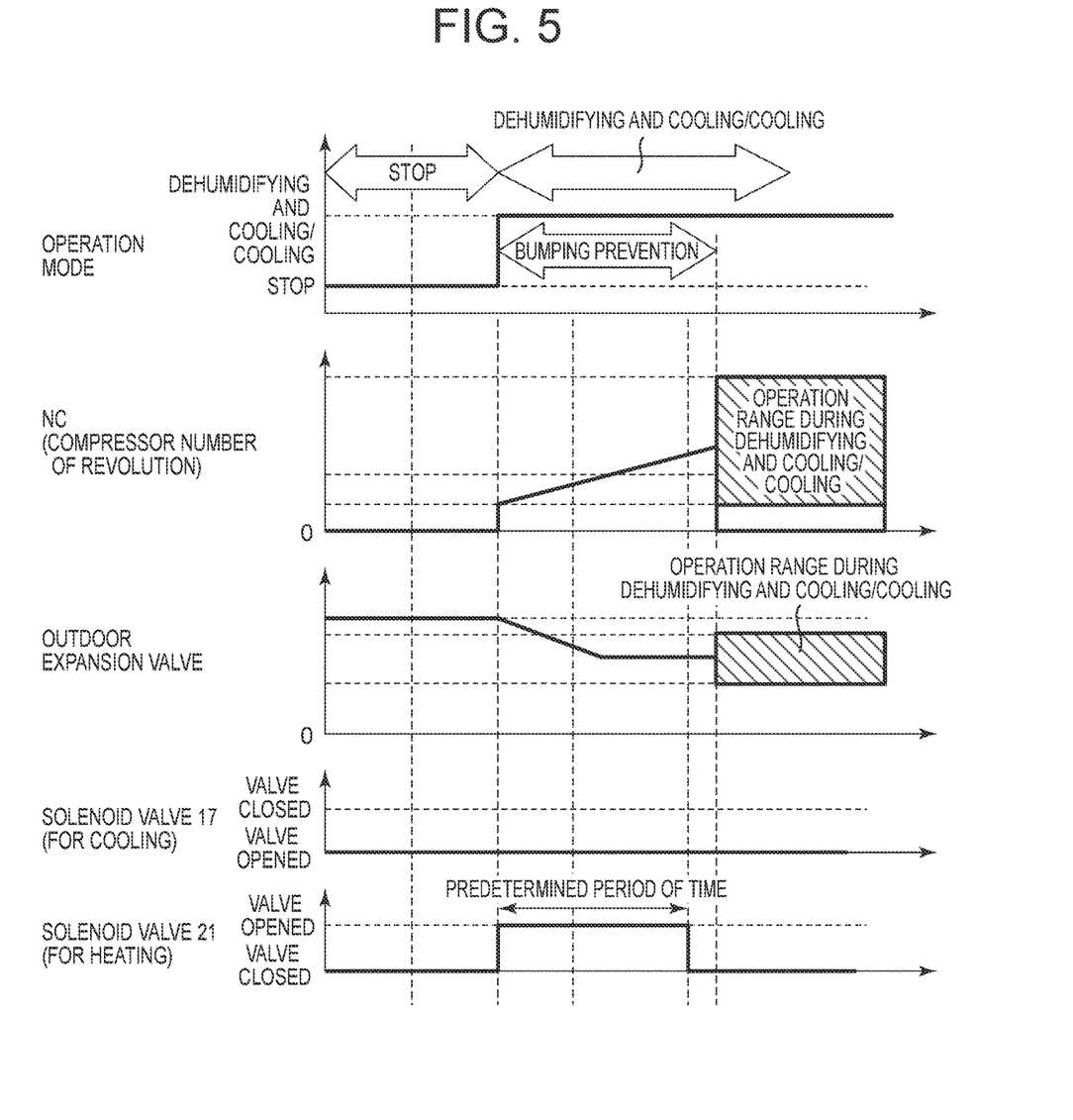
FIG. 5 is a timing chart of each device to explain an example of bumping preventing control to be executed by the controller of FIG. 2 when starting a compressor in the dehumidifying and cooling mode or the cooling mode.

(8-2) Bumping Preventing Control at Start of Compressor 2 in Dehumidifying and Cooling Mode or Cooling Mode Next, description will be made as to an example of the bumping preventing control to be executed by the controller 32 when starting the compressor 2 of the vehicle air conditioning device 1 in the dehumidifying and cooling mode or the cooling mode (the second operation mode), with reference to FIG. 5. A timing chart of FIG. 5 shows the number of revolution NC of the compressor 2, the valve position of the outdoor expansion valve 6, and states of the solenoid valve 17 and the solenoid valve 21, when starting the compressor 2 in the dehumidifying and cooling mode or the cooling mode.

The controller 32 opens the solenoid valve 21 for the heating for a predetermined period of time after the compressor 2 is started from a stop state in the dehumidifying and cooling mode or the cooling mode. In this predetermined period of time, the controller 32 shifts from a fully opened state of the outdoor expansion valve 6 (fully opened during the stop of the compressor 2) to a state of controlling the valve position of the outdoor expansion valve in the operation range of the dehumidifying and cooling mode/the cooling mode, and the controller also operates the compressor 2 to raise the number of revolution NC to the operation range of the dehumidifying and cooling mode/the cooling mode.

Then, after the elapse of the predetermined period of time, the controller 32 closes the solenoid valve 21. It is to be noted that in the period of time until the operation range of the compressor 2 and the outdoor expansion valve 6 shifts to the operation range of the dehumidifying and cooling mode/the cooling mode, the controller executes the bumping preventing control in the embodiment.

Thus, when the controller 32 starts the compressor 2 in the dehumidifying and cooling mode or the cooling mode, the solenoid valve 21 for the heating (the second opening/closing valve) is opened for the predetermined period of time after the start. Consequently, when starting the compressor 2 in the dehumidifying and cooling mode or the cooling mode, a large amount of refrigerant can be returned to the accumulator 12 through the solenoid valve 21, and the inside thereof can be stirred.

In consequence, the stable state in the accumulator 12 can similarly be broken, and hence it is possible to prevent or inhibit the occurrence of the bumping which occurs when the pressure in the accumulator 12 drops in the stable state like the state of closing the upside of the liquid refrigerant with the lid of the oil. Furthermore, it is possible to effectively eliminate or inhibit the liquid compression in the compressor 2 and the generation of the noise in the accumulator 12, it is possible to enhance the reliability of the vehicle air conditioning device 1, and it is also possible to effectively improve the comfort of the passengers.

Also in this case, when the controller 32 starts the compressor 2 in the dehumidifying and cooling mode or the cooling mode, the controller opens the outdoor expansion valve 6 in the state where the solenoid valve 21 is opened, and the compressor 2 also continues its operation. Consequently, a larger amount of refrigerant can similarly flow into the accumulator 12, and it is possible to further promote the stirring of the inside.

Here, as the second operation mode in the present invention, the above-mentioned dehumidifying and heating mode is also present, but in the embodiment, the above bumping preventing control is not executed when shifting from the heating mode to the dehumidifying and heating mode. This is attributed to the refrigerant scavenging operation to be performed when shifting from the heating mode to the dehumidifying and heating mode as described above. In this refrigerant scavenging operation, as described above, the outdoor expansion valve 6 is fully opened, and the operation of the cooling mode is performed. Therefore, the outdoor heat exchanger 7 on an upstream side of the solenoid valve 21 has a high pressure and the accumulator 12 on a downstream side thereof has a low pressure. That is, a difference between a pressure before the solenoid valve 21 and a pressure after the solenoid valve increases, and hence when the solenoid valve 21 is opened for the bumping preventing control, there is a risk that noise is generated.

On the other hand, when the bumping preventing control is executed during the shifting from the heating mode to the dehumidifying and cooling mode or the cooling mode as in the embodiment, the refrigerant scavenging operation is not performed during the shifting from the heating mode to the dehumidifying and cooling mode or the cooling mode. Therefore, also when the solenoid valve 21 is opened for a predetermined period of time after the shift from the heating mode to the dehumidifying and cooling mode or the cooling mode, any noise is not generated in the solenoid valve 21. Furthermore, during stop, the pressure on the upstream side of the solenoid valve 21 and the pressure on the downstream side thereof are balanced. Therefore, even when the solenoid valve is opened at the start of the compressor 2, any noise is not generated. Consequently, according to the embodiment, the inside of the accumulator 12 is effectively stirred in a comparatively short time in early stages, and it is possible to prevent the bumping, while avoiding the generation of the noise in the solenoid valve 21.

It is to be noted that in the embodiment, the present invention is applied to the vehicle air conditioning device 1 to switch among and execute the respective operation modes of the heating mode, the dehumidifying and heating mode, the dehumidifying and cooling mode, the cooling mode and the MAX cooling mode, but the present invention is not limited to the embodiment. The present invention is also effective for the vehicle air conditioning device to change and execute the heating mode, one of the other operation modes or any combination thereof.

For example, also when shifting to the dehumidifying and heating mode to perform the above-mentioned refrigerant scavenging operation during the shifting, the present invention may be executed in a case where the generation of the noise in the solenoid valve 21 is not taken into consideration or in a case where a structure to avoid the generation of the noise is employed. Furthermore, the present invention may be executed when the mode can be changed to directly shift from the heating mode to the MAX cooling mode.

Furthermore, the present invention is not limited to the changing control of the respective operation modes described in the embodiment, and appropriate conditions may be set by employing one, any combination or all of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, and the presence/absence of the requirement for the dehumidifying of the vehicle interior, in accordance with the capability and use environment of the vehicle air conditioning device.

Additionally, the auxiliary heating device is not limited to the auxiliary heater 23 described in the embodiment, and a heating medium circulating circuit which circulates a heating medium heated by a heater to heat air in an air flow passage, a heater core which circulates radiator water heated by an engine or the like may be utilized. Furthermore, the constitutions of the refrigerant circuit R which are described in the above respective embodiments are not limited thereto, and needless to say, the constitutions are changeable without departing from the gist of the present invention.

DESCRIPTION OF REFERENCE NUMERALS

1 vehicle air conditioning device
2 compressor
3 air flow passage
4 radiator
6 outdoor expansion valve
7 outdoor heat exchanger
8 indoor expansion valve
9 heat absorber
12 accumulator
17 solenoid valve (a first opening/closing valve)
21 solenoid valve (a second opening/closing valve)
23 auxiliary heater (an auxiliary heating device)
27 indoor blower (a blower fan)
28 air mix damper
30 solenoid valve (a third opening/closing valve)
40 solenoid valve (a fourth opening/closing valve)
32 controller (a control device)
35 bypass pipe
45 bypass device
R refrigerant circuit

The invention claimed is:

1. A vehicle air conditioning device comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior,
an outdoor expansion valve to decompress the refrigerant flowing out from the radiator and flowing into the outdoor heat exchanger,
an indoor expansion valve to decompress the refrigerant flowing into the heat absorber,
an accumulator connected to a refrigerant suction side of the compressor,
a first opening/closing valve to send the refrigerant flowing out from the outdoor heat exchanger, through the indoor expansion valve to the heat absorber,
a second opening/closing valve to send the refrigerant flowing out from the outdoor heat exchanger to the accumulator without passing the heat absorber, and
a control device,
so that the control device switches between and executes a first operation mode to close the first opening/closing valve, open the second opening/closing valve, thereby let the refrigerant discharged from the compressor radiate heat in the radiator, decompress the refrigerant from which the heat has been radiated, through the outdoor expansion valve, let the refrigerant absorb heat in the outdoor heat exchanger, send, to the accumulator, the refrigerant flowing out from the outdoor heat exchanger, and suck the refrigerant from the accumulator into the compressor, and
a second operation mode to open the first opening/closing valve, close the second opening/closing valve, thereby decompress the refrigerant flowing out from the outdoor heat exchanger through the indoor expansion valve, let the refrigerant absorb heat in the heat absorber, send, to the accumulator, the refrigerant flowing out from the heat absorber, and suck the refrigerant from the accumulator into the compressor,
wherein when the control device shifts from the first operation mode to the second operation mode, the second opening/closing valve is opened for a predetermined period of time after the shift.

2. A vehicle air conditioning device comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior,
an outdoor expansion valve to decompress the refrigerant flowing out from the radiator and flowing into the outdoor heat exchanger,
an indoor expansion valve to decompress the refrigerant flowing into the heat absorber,
an accumulator connected to a refrigerant suction side of the compressor,
a first opening/closing valve to send the refrigerant flowing out from the outdoor heat exchanger, through the indoor expansion valve to the heat absorber,
a second opening/closing valve to send the refrigerant flowing out from the outdoor heat exchanger to the accumulator without passing the heat absorber, and
a control device,
so that the control device switches between and executes a first operation mode to close the first opening/closing valve, open the second opening/closing valve, thereby let the refrigerant discharged from the compressor radiate heat in the radiator, decompress the refrigerant from which the heat has been radiated, through the outdoor expansion valve, let the refrigerant absorb heat in the outdoor heat exchanger, send, to the accumulator, the refrigerant flowing out from the outdoor heat exchanger, and suck the refrigerant from the accumulator into the compressor, and
a second operation mode to open the first opening/closing valve, close the second opening/closing valve, thereby decompress the refrigerant flowing out from the outdoor heat exchanger through the indoor expansion valve, let the refrigerant absorb heat in the heat absorber, send, to the accumulator, the refrigerant flowing out from the heat absorber, and suck the refrigerant from the accumulator into the compressor,
wherein when the control device starts the compressor in the second operation mode, the second opening/closing valve is opened for a predetermined period of time after the start.

3. The vehicle air conditioning device according to claim 1, wherein when shifting from the first operation mode to the second operation mode or when starting the compressor in the second operation mode, the control device opens the outdoor expansion valve in a state where the second opening/closing valve is opened, and operate the compressor.

4. The vehicle air conditioning device according to claim 1, comprising:
a bypass pipe bypassing the radiator and the outdoor expansion valve, to send, directly into the outdoor heat exchanger, the refrigerant discharged from the compressor,
a third opening/closing valve to send the refrigerant discharged from the compressor to the radiator,
a fourth opening/closing valve to send the refrigerant discharged from the compressor to the bypass pipe, and
an auxiliary heating device to heat the air to be supplied from the air flow passage to the vehicle interior,
wherein the first operation mode is a heating mode, and in the heating mode, the control device opens the third opening/closing valve and closes the fourth opening/closing valve, and
the second operation mode includes any one, any combination or all of a dehumidifying and heating mode to close the third opening/closing valve and the outdoor expansion valve, open the fourth opening/closing valve, thereby send the refrigerant discharged from the compressor from the bypass pipe to the outdoor heat exchanger, let the refrigerant radiate heat, decompress the refrigerant from which the heat has been radiated, through the indoor expansion valve, let the refrigerant absorb heat in the heat absorber, and generate heat in the auxiliary heating device,
a dehumidifying and cooling mode to open the third opening/closing valve, close the fourth opening/closing valve, thereby send the refrigerant discharged from the compressor from the radiator to the outdoor heat exchanger, let the refrigerant radiate heat in the radiator and the outdoor heat exchanger, decompress the refrigerant from which the heat has been radiated, through the indoor expansion valve, and then let the refrigerant absorb heat in the heat absorber,
a cooling mode to open the third opening/closing valve, close the fourth opening/closing valve, thereby send the refrigerant discharged from the compressor from the radiator to the outdoor heat exchanger, let the refrigerant radiate heat in the outdoor heat exchanger, decompress the refrigerant from which the heat has been radiated, through the indoor expansion valve, and then let the refrigerant absorb heat in the heat absorber, and
a maximum cooling mode to close the third opening/closing valve and the outdoor expansion valve, open the fourth opening/closing valve, thereby send the refrigerant discharged from the compressor from the bypass pipe to the outdoor heat exchanger, let the refrigerant radiate heat, decompress the refrigerant from which the heat has been radiated, through the indoor expansion valve, and then let the refrigerant absorb heat in the heat absorber.

5. The vehicle air conditioning device according to claim 4, wherein the second operation mode includes the dehumidifying and cooling mode and/or the cooling mode.

* * * * *